Figure 1:
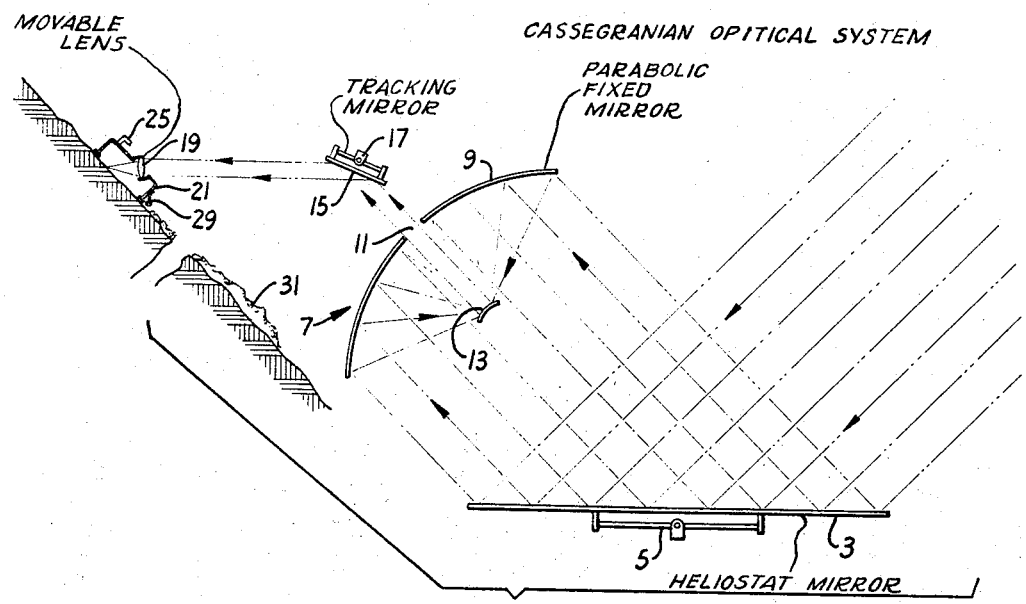

INVENTOR.
BEN WADE OAKS DICKINSON, III
ATTORNEYS

United States Patent Office 3,407,122
Patented Oct. 22, 1968

3,407,122
SOLAR STILL WITH A CASSEGRANIAN OPTICAL SYSTEM
Ben Wade Oakes Dickinson III, San Francisco, Calif., assignor, by mesne assignments, to Bechtel International Corporation, San Francisco, Calif., a corporation of Delaware
Filed July 23, 1963, Ser. No. 297,048
2 Claims. (Cl. 202—83)

This invention relates to a process for extracting water and other chemicals from rocks under vacuum conditions utilizing the sun as the principal source of energy. The invention is particularly applicable to a process for recovering water and other chemicals from the moon or similar bodies which are substantially lacking in atmosphere.

It has been estimated by the National Aeronautics and Space Administration that the cost of transporting materials to the moon will be on the order of $4,000 to $5,000 per pound, so that it is essential to provide some method of extracting water and other chemicals from the moon to avoid this expense. Furthermore, it has been estimated by the National Aeronautics and Space Administration that initially it will cost $60,000 to $100,000 per manhour for labor on the moon, so it is further essential that any equipment not only be light in weight but also that its operation be as simple as possible and that it have minimum maintenance requirements.

Since the percentage of water in lunar rocks is probably low, the system must be capable of processing large quantities of material. It is also desirable that the material be treated in place to avoid the handling of large quantities of low grade ore and that lunar gravity be employed for the removal of waste material. Additionally, it is desirable that any system be adaptable for a wide range of conditions since at the present time the exact characteristics of lunar materials are unknown.

Additionally, it is highly desirable that the sun be used as a principal source of energy for operating such a system, since if a nuclear chemical or other source were used, it would involve the transportation of fuel material to the moon, probably require the transporting of the low grade ore to a processing station, probably increase the mass of the system thereby limiting the mobility of the device, and might induce radioactivity in the product and waste material.

The present invention envisions two modes of operation. The first mode, termed hereinafter the Direct Process, provides a unique method for extracting water from rock. The second mode, termed hereinafter the Indirect Process, makes use of inherent chemical properties to produce a stable, vacuum-storable intermediate product enriched in water content. This solid intermediate can be treated in a subsequent step to release either water as such or to release the oxygen and hydrogen separately.

It is therefore an object of the present invention to provide a method of extracting water and other chemicals from lunar materials.

Another object of this invention is to provide for such a recovery system utilizing the sun as a principal heat source.

Still another object of this invention is to provide a system for extracting water and chemicals which does not involve the transportation of raw materials.

Still another object of this invention is to provide an extraction system which is light in weight and which will operate with a minimum of maintenance difficulty.

Other objects will be apparent from the specification which follows.

In general, the objects of the present invention are accomplished by providing a light weight solar furnace which is highly mobile and which is adapted for processing lunar materials in place.

Figure 2:
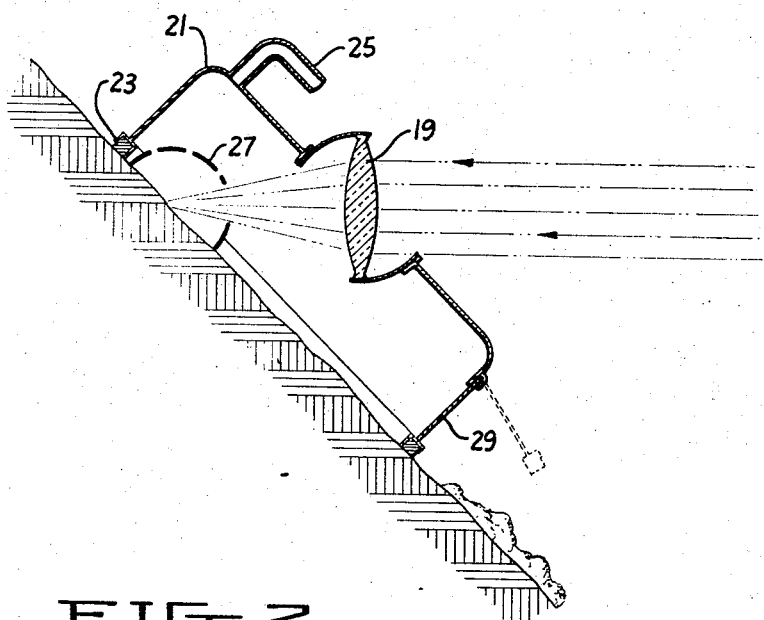

In the drawings forming a part of this application:
FIGURE 1 is a schematic diagram of an embodiment of the present invention.
FIGURE 2 is an enlarged diagram of the collection chamber shown in FIGURE 1.

Referring now to the drawings by reference characters, there is shown in the drawings a main flat heliostat mirror 3 supported by a gimbal assembly 5 so that the mirror can be moved in two degrees of freedom. Mounted adjacent to the heliostat is a Cassegranian optical system, generally designated 7, which comprises a parabolic fixed mirror 9 having a central aperture 11 therein and a small convex mirror 13. The light beam from the Cassegranian system is reflected by a small tracking mirror 15 mounted on a gimbal assembly 17 from which the beam is reflected to a movable lens 19. The lens 19 is mounted in a collection chamber 21. The collection chamber 21 may be provided with a vapor-tight seal 23 and an effluent conduit 25. As will be apparent later, the vapor-tight seal 23 and conduit 25 are necessary only when the direct process is used; these parts can be eliminated when the indirect process is used. The chamber also contains a radiation heat trap 27 and is preferably provided with an automatic trap door 29 for removal of waste material, as at 31. It is contemplated that in one practical embodiment of the later described device, the main heliostat mirror will be about 45 feet in diameter and the Cassegranian optical system will produce a light beam of about 1 foot in diameter.

Various means can be used for supporting the collection chamber on a slope or outcropping and for moving it slowly over the surface of the rock. For instance, pulleys can be provided at each end of the horizontal traverse and at the top of the slope so that the chamber can be moved vertically and horizontally by adjusting the cable system. For moderate slopes, a beam resting against the slope with wheels or treads at its bottom can be used to support and move the chamber. When the device is used on steep cliffs, the chamber can be supported from a single point near the top of the cliff and swung like a pendulum through a long radius of arc. Although the process is preferably carried out on a slope so that gravity can be used to remove waste material, it can also be conducted on flat ground.

The waste product will be a hard, glass-like material which is much harder and which has a higher melting point than the original rock. If such glass covers rock from which water is to be extracted, the glass must be removed to provide a clean surface for the next pass. The glass can be cracked by passing a heavy pronged ball over the surface, or it can be cracked by natural or forced cooling, or it can be cracked by differential thermal expansion promoted by using the present invention as a pulse heater at selected spots. In any case, since the device is preferably used on a relatively steep slope, lunar gravity can be used to remove the broken glass either by moving the collection chamber or by withdrawing the material through the trap door 29.

Two modes of operation, the aforementioned direct and indirect processes can be effected when utilizing the present invention for water or chemical recovery.

In the direct process the maximum temperature developed at the hot spot is maintained at a temperature in excess of 1200° C. The desired temperature can be maintained by varying the speed at which the beam of light is moved over the surface. At this temperature about 90% of the water contained is released from most volcanic rocks. There will be some losses due to mirror reflectivity loss, mirror geometrical imperfections, radiation from the hot rock, and thermal diffusion into the rock mass. Assuming that each mirror has a reflectivity of 0.8, a 50% geometry loss, a 50% diffusion loss, and a vapor recovery efficiency of 67%, a system utilizing a heliostat of 45 feet in diameter operating on rock containing 1% water would produce 0.4 lb. of free water per hour or, operating on rock having a water content of only 0.1%, would produce 0.04 lb. of water per hour. In the direct process, the water vapor would be removed through the conduit 25 and sent to a suitable water condensation and storage apparatus. If the direct process is used, it is highly desirable to use a labyrinth seal 23 to prevent water loss and thus increase the efficiency.

Experiments using an electron beam furnace as a source of heat in a vacuum have shown that ordinary basalt rock, when heated to a temperature of 1600 to 1700° C., melts with an effluent vapor which condenses on the walls of a cooled vessel to a white powdery substance. An exact analysis of this material has not been made, but it is known to contain a substantial amount of water, together with some sodium. This dry powder can be stored under vacuum conditions and can be later processed by electrolysis to produce oxygen and hydrogen, or can be processed in other ways to produce water as such.

Two different recovery techniques can be utilized in operting the equipment; either of these recovery techniques can be applied to the direct or the indirect process. The first technique is essentially a hole-boring operation in which the concentrated hot spot and collection system are kept in one location on a slope and a hole is progressively deepened, melting the rock and allowing the waste molten rock to pour out of the hole. For flat locations a predrilled hole is used and the melted rock from which water has been removed gradually fills this hole. For all applications the desired products are released from the freshly exposed rock at the inner end or heated portion of the hole. This can be continued until adequate melting of the rock is prevented by the high rate of heat diffusion into the exposed rock surface.

The second technique is applicable to situations where it is not desirable or possible to melt deep holes into the rock face. In this system, the hot spot is moved across the slope face continuously while removing the water-bearing product from a shallow, narrow strip. After the water has been removed from the surface material, the depleted surface will be in the form of a hard, glassy material, as described above, which must be removed before another pass is made over the same area.

I claim:
1. Apparatus for recovering water and valuable chemicals from lunar and similar surfaces comprising in combination:
   (a) a chamber having an open bottom adapted to be moved over a surface to be treated,
   (b) sealing means around the bottom of said chamber,
   (c) a Cassegranian optical system for concentrating the sun's rays on a small area within said chamber,
   (d) a trap door structure for removing waste solid material from said chamber and
   (e) means for recovering volatized material from said chamber.
2. The apparatus of claim 1 wherein a large flat heliostat movable in two degrees of freedom is provided to reflect light into said Cassegranian optical system and a small flat tracking mirror movable in two degrees of freedom is provided to receive the rays of light from said Cassegranian optical system together with a movable lens to concentrate the light on the lunar surface.

References Cited
UNITED STATES PATENTS

| | | | |
|---|---|---|---|
| 1,302,363 | 4/1919 | Graham | 202—234 X |
| 1,678,711 | 7/1928 | Shipman | 88—25 |
| 2,803,591 | 8/1957 | Coanda | 202—234 |
| 2,820,744 | 1/1958 | Lighter | 202—234 |
| 2,902,028 | 9/1959 | Manly | 202—234 X |

FOREIGN PATENTS

| | | |
|---|---|---|
| 974,650 | 11/1964 | Great Britain. |
| 386,077 | 5/1963 | Japan. |

NORMAN YUDKOFF, *Primary Examiner.*